Patented Mar. 11, 1952

2,588,452

UNITED STATES PATENT OFFICE 2,588,452

HYDROCARBON SYNTHESIS USING A SPENT AMMONIA SYNTHESIS CATALYST

Edwin T. Layng, New York, N. Y., assignor to Hydrocarbon Research, Inc., New York, N. Y., a corporation of New Jersey No Drawing. Application May 10, 1946, Serial No. 668,764

4 Claims. (Cl. 260—449.6)

The present invention relates to the production of hydrocarbons and oxygenated hydrocarbons or either of them by the interaction of a carbon oxide with hydrogen in the presence of a catalyst, and more specifically, is concerned with new and improved catalyst for this reaction.

The catalytic reduction of carbon oxide and in particular carbon monoxide with hydrogen is normally carried out in the presence of a catalytic material such as iron, nickel, cobalt or even, in some cases, ruthenium, containing small percentages of promoters such as an alkali metal or alkaline earth metal compound. The catalytic materials may be unsupported, or if desired, may be supported on various supports such as filtrols, diatomaceous earth and the like prepared in a variety of ways, as for example, by decomposing metal carbonyls or by precipitation from salt solutions, followed in each case by reduction at relatively high temperatures in a stream of hydrogen.

The reduction and further conditioning of the catalyst prior to use, is a difficult and troublesome operation upon which the catalytic character and activity of the product depends in large measure.

In accordance with the present invention, it has been discovered that the reaction in question is effectively catalyzed by an iron catalyst which has become spent in the well-known ammonia synthesis. In short, an ammonia catalyst formed predominately of iron and containing substantially no more than 5% alkali content, which has been used in the ammonia synthesis to such an extent that it no longer has sufficient activity for commercial use, is ideal for catalyzing the present reaction when carried out under conditions of good control as, for example, in operation with a fluidized powdered bed of catalyst.

As is well-known the reaction of gaseous nitrogen and hydrogen proceeds at relatively high pressures sometimes in the order of from 100 to 200 atmospheres and under temperatures of about 650 to 700° F. This reaction, for the purpose of producing pure ammonia may be catalyzed with a number of substances including iron powder prepared in various ways. According to one conventional method a pure iron is fused with small quantities of alkaline earth oxide followed by a reduction in a stream of hydrogen. Alternatively ferric oxide may be fused with a small proportion of lime and similarly reduced. In each case the result is essentially a pure reduced iron powder with certain small selected additions of alkalis or alkaline earth preferably in an unsintered form.

After a substantial period of use in the ammonia synthesis operation the catalyst becomes progressively poisoned or spent to a point where it is no longer economically suitable for commercial use in the process and where further regeneration is not economically practical. It is this product, which in the course of the ammonia synthesis, has substantially lost its catalytic activity that I hereinafter refer to as spent iron-ammonia synthesis catalyst.

In carrying out the catalytic synthesis of hydrocarbons or oxygenated hydrocarbons from carbon monoxide and hydrogen, this spent iron-ammonia synthesis catalyst possesses good activity and gives a high yield comparable to the best iron catalysts now in use.

It should be noted however that such results are not fully achieved in fixed bed operation due presumably to lack of precise temperature control which is characteristic of this type of operation. Without being limited to the specific theoretical considerations advanced herein in explanation thereof, I find that the exceptionally good results mentioned are obtained when operating, for example, with a fluidized catalyst bed where temperature control may be maintained within a few degrees of predetermined optimum throughout the catalyst bed. Similar results may be attained with processes exhibiting a similar degree of control.

More specifically the art of fluidization, as is known, contemplates the use of catalyst in relatively finely divided powdered form through which gaseous reactants pass uniformly under conditions such that the individual particles are in effect maintained in random vibratory movement, by a surrounding gaseous phase. Depending on the relative size of the particles and the rate of gaseous flow, the powder may remain substantially entrained in the gaseous fluid but preferably will tend to settle within the reaction zone in accordance with the phenomenon of "hindered settling" to provide a condition of so-called dense phase fluidization wherein the fluidized mass of powder exhibits a pseudo-liquid level.

This technique is of particular advantage in that cooling surfaces disposed in contact with the fluidized mass of reactants are effective to extract the exothermic heat of reaction and to maintain a degree of temperature uniformity within the reaction zone characteristic of a turbulent fluid of good heat transfer properties.

Accordingly, therefore, the present invention contemplates the reaction of hydrogen and carbon oxide in proper proportion in a reaction zone occupied by a powdered fluidized mass of iron catalyst which has become spent in the operation of the ammonia synthesis, the reaction being carried out at proper reaction temperature and pressure and the reaction products evolved from the pseudo-liquid level being cooled and then separated for further treatment. While numerous means are available for carrying out such reaction, one device suitable for this purpose is illustrated in U. S. Patent No. 2,474,845, issued July 5, 1949.

Any iron catalyst which has become spent in the synthesis of ammonia is satisfactory for use in accordance with the present invention provided that it is essentially iron containing not more than about 5% and preferably not less than 0.3% alkali. In referring to the percentage of alkali content I, for purposes of convenience, mean percentage by weight expressed as equivalent potassium oxide ($K_2O$) on the basis of the total weight of reduced catalyst. Furthermore by the term alkali content I refer to combined alkali metal and alkaline earth metal compounds expressed as equivalent potassium oxide.

Yet more specifically when proceeding in accordance with the preferred embodiment of the present invention, it is advisable that the total alkali metal content of the catalyst be no greater than 3% and the content of alkaline earth metal be limited to 2% on the foregoing basis. In other words even when operating under maximum limit of 5% alkali, it is desirable that the alkali metal content be restricted to a weight of about 3% and the alkaline earth metal content be restricted to 2%. Where, however, either one of the additions are present in proportion less than that indicated as limiting, the other may be present in proportion in excess of its optimum limit provided that the total maximum limit is not exceeded. Spent catalysts of this character containing from about 1.5 to 2% of alkaline have been found ideal in connection with the present invention and where desired the alkali content may be further lowered by washing with water or other alkali solvents to any desired level of concentration, preferably in no case lower than 0.3%.

The particle size of the catalyst when employed in connection with fluidized operation may vary with wide limits. Under usual conditions of linear reactant velocity and dense phase fluidization, however, the catalyst may, for example, have a particle size of 200 mesh and finer, 60% passing through a 325 mesh screen. The catalyst of this character is preferably fluidized in a zone designed to permit even cross sectional flow of the reactant gases at a linear velocity from about 1 to 1.5 feet per second based upon the cross sectional area of the reaction zone in empty condition, and with the velocity of the incoming feed gases measured at a temperature and pressure substantially that of the reaction zone. Under these conditions the powdered catalyst particles, while being supported in random movement, in the flow of gaseous product settle to a point where there is a reasonably sharp demarcation between the upper surface of the catalyst and the reactant products being continuously discharged and separated for recovery or further treatment.

By providing suitable cooling surfaces, as for example, coils or other heat exchange means located within the reaction zone and in direct heat exchange relationship with the catalyst, a temperature can be maintained throughout the reaction zone which does not vary more than 5 to 10° from the selected reaction temperature.

When operating with the spent ammonia catalyst the optimum temperature preferably falls within the range of 550 to 650° F. depending on the desired predominate molecular weight of the hydrocarbons and/or oxygenated hydrocarbons to be produced. For example, an operating temperature of 600° F. and a pressure of 250 pounds per square inch gauge are satisfactory in connection with the synthesis of hydrocarbons boiling predominately in a motor gasoline range.

It is important to point out that the catalyst while essentially iron may contain without detriment, small percentages of normal impurities or other ingredients occurring as inert diluents or incidental to promotion of the ammonia synthesis. Thus, for example, up to 3 or 4% alumina and 2% silica as well as minor percentages of magnesia commonly associated with iron as impurity, appear to exert no detrimental effect insofar as the present process is concerned.

The following example illustrates the present invention more in detail, it being understood that the details of the example are not disclosed by way of limitation only for the purposes of explaining, in greater detail, one preferred form of operation. In accordance with the example, catalyst which has become spent in the ammonia synthesis is disposed within a reactor provided with cooling surfaces ample to maintain a reaction temperature of 615° F. throughout the catalyst mass, within 10° F. variation at all points. The catalyst comprises essentially powdered iron with about 3% alumina ($Al_2O_3$), 1.65% $K_2O$, 0.23% $Na_2O$ and 1.8% silica ($SiO_2$), particles of which pass a 200 mesh screen, 60% of the particles passing a 325 mesh screen. Fresh feed gas is introduced into the bottom of the reactor at the rate of 3,940 standard cubic feet of gas per hour, mixed with 19,500 standard cubic feet of recycle feed gas.

The fresh feed gas comprises essentially 25% of carbon monoxide and 64% of hydrogen with about 7% $CO_2$ and 3.9% methane. The recycle feed gas comprises the gaseous effluent from the reactor from which the liquid products have been condensed and is continuously recycled as indicated above in the ratio of about 5:1 on the basis of the fresh feed gas.

The exothermic reaction is controlled by the cooling surfaces. The aforesaid temperature of approximately 615° F. is maintained throughout the catalyst mass with a pressure of 205 pounds per square inch gauge and a space velocity of 660 v.[1]/hr./v.[2], on the basis of the volume of fresh feed gas and about 3,925 v./hr./v. on the basis of total feed gas. The linear velocity of the feed gases passing into the catalyst is about 1.22 feet per second with the result that the catalyst is maintained in a state of dense phase fluidization. The products of reaction are recovered in conventional manner.

Over a period of continuous operation of 32 hours the average production of total liquid hydrocarbons amounts to 222 ccs. per standard cubic meter of fresh feed gas mainly in the gasoline boiling range. In addition for each standard cubic meter of fresh feed gas approximately 29 ccs. oxygenated hydrocarbons having the characteristics of organic alcohols are recovered.

---

[1] Volume of gas measured under standard conditions.
[2] Volume of reactor space occupied by fluidized catalyst under the existing gas flow conditions in the reactor.

From the foregoing it will be apparent that the invention permits operation at extremely close to theoretical yield of hydrocarbons and oxygenated hydrocarbons of a desirable product character. While the fresh feed synthesis gas employed in the foregoing example has a hydrogen to carbon monoxide ratio of about 2.5:1.0, this, as is known, may be varied widely in accordance with the desires of the operator and the preferred result to be achieved. Normally, however, the ratio will approximate 2:1. Pressures and temperatures may similarly be varied within the operating ranges known in the art.

The present invention is of particular significance in eliminating the necessity for careful reduction and pretreatment of the catalyst prior to use. It is commonly necessary with most catalysts, even after careful reduction to submit them to a break-in period of careful treatment with special synthesis gas before settled operation is achieved. This is not necessary with the present catalyst due presumably to the advantageous conditioning effect of the ammonia synthesis operation in placing the catalyst particles in a favorable condition for hydrocarbon synthesis.

It may be advantageous in some instances, for example, where the catalyst has been subjected to undue poisoning by sulfur or other known poisons for hydrocarbon synthesis catalyst, to submit the catalyst to a brief pretreatment for removing such poisons. This procedure however is not normally objectionable and can be conveniently accomplished by briefly passing hydrogen through the mass at a temperature from 500 to 1000° F. until tests show the substantial elimination of sulfur content.

While specific temperatures have been referred to above the temperature of the reaction usually ranges between about 425 to 700° F., an increase in temperature normally resulting in a shift of hydrocarbon products toward the lower boiling range.

Obviously many modifications and variations of the invention set forth above may be made without departing from the spirit and scope thereof and only such limitations should be imposed as indicated by the following claims.

I claim:

1. In the catalytic synthesis of liquid products of the class consisting of liquid hydrocarbons and liquid oxygenated hydrocarbons by the reduction of carbon monoxide with hydrogen, the improvement which comprises passing nitrogen and hydrogen in contact with particulate iron catalyst containing alkali in an amount of about 0.3% to about 5.0% by weight of said catalyst, said weight percentage being expressed as equivalent potassium oxide, effecting the synthesis of ammonia during the passage of said nitrogen and hydrogen in contact with said iron catalyst, discontinuing said synthesis of ammonia when said iron catalyst becomes substantially inactive for said synthesis of ammonia, and employing the resulting inactive iron catalyst, without intervening reducing treatment, in said catalytic synthesis of liquid products by passing carbon monoxide and hydrogen through a fluidized mass of said inactive iron catalyst at a temperature in the range of 425° to 700° F. and a superatmospheric pressure to effect said catalytic synthesis of liquid products.

2. A process as defined in claim 1 wherein said alkali is potassium oxide.

3. In the catalytic synthesis of liquid products of the class consisting of liquid hydrocarbons and liquid oxygenated hydrocarbons by the reduction of carbon monoxide with hydrogen, the improvement which comprises passing nitrogen and hydrogen in contact with particulate iron catalyst containing alkali in an amount of about 0.3% to about 5.0% by weight of said catalyst, said weight percentage being expressed as equivalent potassium oxide, effecting the synthesis of ammonia during the passage of said nitrogen and hydrogen in contact with said iron catalyst, discontinuing said synthesis of ammonia when said iron catalyst becomes substantially inactive for said synthesis of ammonia, and employing the resulting inactive iron catalyst, without intervening reducing treatment, in said catalytic synthesis of liquid products by passing carbon monoxide and hydrogen through a mass of said inactive iron catalyst at a temperature in the range of 550° to 650° F. and a superatmospheric pressure to effect said catalytic synthesis of liquid products.

4. A process as defined in claim 3 wherein said alkali is potassium oxide.

EDWIN T. LAYNG.

REFERENCES CITED

The following references are of record in the file of this patent:

UNITED STATES PATENTS

| Number | Name | Date |
|---|---|---|
| 1,489,497 | Larson | Apr. 8, 1924 |
| 1,746,464 | Fischer et al. | Feb. 11, 1930 |
| 1,909,442 | Williams | May 16, 1933 |
| 2,287,891 | Linckh | June 30, 1942 |
| 2,292,570 | Klemm et al. | Aug. 11, 1942 |
| 2,360,787 | Murphree et al. | Oct. 17, 1944 |
| 2,494,561 | Kemp, Jr. | Jan. 17, 1950 |